Aug. 28, 1945.  E. R. PRICE  2,383,682
CONTROL VALVE
Filed Nov. 28, 1941
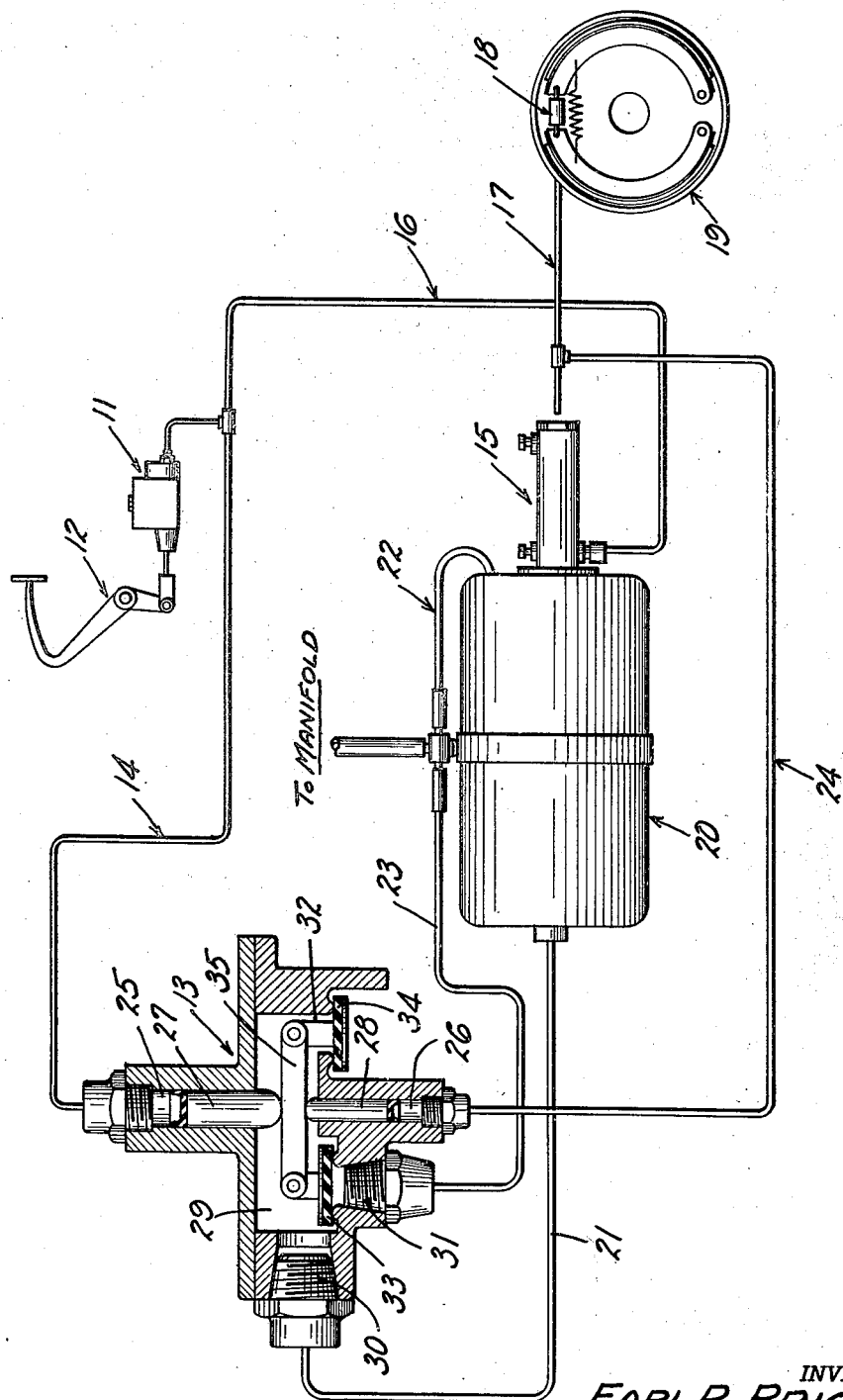
INVENTOR
EARL R. PRICE
BY
*M. W. McConkey*
ATTORNEY Patented Aug. 28, 1945

2,383,682

UNITED STATES PATENT OFFICE 2,383,682

CONTROL VALVE

Earl R. Price, South Bend, Ind., assignor to Bendix Aviation Corporation, South Bend, Ind., a corporation of Delaware Application November 28, 1941, Serial No. 420,805

1 Claim. (Cl. 121—46.5)

This invention relates to an operating system for brakes or the like in which a booster or power unit is employed. My invention relates broadly to any fluid pressure system which is operated conjointly, by manual means and power means, but I have chosen to illustrate my invention as applied to a hydraulic braking system.

In my co-pending applications Ser. No. 368,560, filed December 5, 1940, and Ser. No. 407,117, filed August 16, 1941, now issued as Patents Nos. 2,353,755 and 2,332,340, respectively, I have disclosed a hydraulic braking system in which pressure is built up by a combination of manual means (using manual in the broad sense) and power or booster means. In the system disclosed in these applications, pressure created manually in a hydraulic cylinder operates to accomplish two things: first to apply pressure through a series of intermediate parts to brake actuating wheel cylinders or motors and second to operate a valve device which controls a booster, which in turn adds its effort to the manual force in creating applying pressure in the wheel cylinders. Both of my earlier applications have included in the brake applying systems disclosed means for exerting a reaction against the manually applied force to indicate to the operator the extent of power which is being applied to operate the brakes. In my earlier applications the reaction or "feel" is provided within the valve device which controls the booster, and the amount or strength of the reaction depends upon the power which is being utilized to aid in applying the brakes.

It is the object of this invention to provide, in a braking system of the same general type referred to in the earlier applications, a means for exerting reaction in which the amount of reaction will depend upon the pressure in the hydraulic fluid at the wheel cylinders rather than the power which is being used to create pressure in the hydraulic fluid.

In line with the above I have provided a combined manual and power system for operating hydraulic brakes in which reaction or "feel" depends upon the pressure of the hydraulic liquid in hydraulic lines which are directly connected to the brake operating wheel cylinders. Thus, in a brake system which utilizes both manually and power created forces I provide a reaction which depends, not on the amount of power alone, but on the amount of pressure created by the power and manual means acting together.

A second object of my present invention is to accomplish the end accomplished in my earlier applications with a system which may be more economical than any other comparative system. In this connection, it may be noted that I have eliminated entirely the use of an independent diaphragm or other reaction sensitive means which must be used whenever reaction depends upon the amount of power exerted by a differential air pressure power unit.

Other objects and features of my invention will be apparent during the course of the following description, reference being had to the accompanying drawing, in which:

Figure 1 is a generally diagrammatical illustration of a hydraulic brake operating system embodying my invention, with the control and reaction valve which is the center of the invention shown in vertical section.

The operation of the system illustrated in Figure 1 generally compares to that of the systems disclosed in either of my earlier applications referred to above. Generally, it comprises a pedal operated master cylinder 11, a pedal 12, a control valve 13 connected by a conduit 14 to the master cylinder 11, an auxiliary or booster operated master cylinder 15 connected by a conduit 16 with the master cylinder 11 and by a conduit 17 with a wheel or motor cylinder 18 which is adapted to operate a brake 19 in the customary manner. The auxiliary cylinder 15 is adapted to be operated in part by a differential air pressure booster or power unit 20 which has one side connected by a differential air pressure line 21 to the valve 13 and has its other side connected by a vacuum line 22 to the intake manifold, which is the usual source of vacuum. A branch vacuum line 23 connects the intake manifold to the control valve 13. Of particular importance in this application is a hydraulic conduit 24 which connects the conduit 17 to the control valve 13.

The control valve 13 forms two opposing hydraulic chambers 25 and 26, in which are reciprocable pistons 27 and 28 respectively. The control valve 13 also has a central chamber 29 and three ports 30, 31 and 32 opening into the chamber 29. The port 30 connects the chamber 29 by means of line 21 with one side of the booster 20. Ports 31 and 32 are controlled respectively by valve elements 33 and 34, which are preferably of the poppet type. When valve element 33 is moved to open port 31 it connects chamber 29 through conduit 23 with the system of suction; when valve element 34 opens port 32 it connects chamber 29 with the atmosphere. A valve control member 35 which may comprise a rod or bar, is shown connected at opposite ends to the valve elements 33 and 34 and is positioned between the pistons 27 and 28 with the said pistons bearing against the rod 35 so that reciprocating movement of the pistons moves the rod 35 to open and close the suction and atmosphere ports 31 and 32.

Operation of the system is generally the same as that of the systems shown in my prior applications referred to above with the exception of the control valve 13. Manipulation of the pedal 12 places under pressure fluid in the cylinder 11 and the pressure is exerted in two ways: first, through the auxiliary cylinder 15, to actuate the motor 18 and, second, through the piston 27 in control valve 13, to move the rod or bar 35 to first close the vacuum or suction port 31 and subsequently open the atmosphere port 32 to admit air under atmospheric pressure through chamber 29 and conduit 21 to one side of booster 20. Since the other side of booster 20 is at all times connected by line 22 to the source of suction, admission of air under atmospheric pressure through line 21 will cause the piston (not shown) in the booster to move in the direction of the auxiliary cylinder 15 and increase the pressure on the liquid in the said cylinder 15, at the same time closing the compensating opening (not shown) in the piston of the cylinder 15. All this is exactly the same as the operation of the booster and auxiliary cylinder in my prior applications referred to above. The manually produced pressure and the booster produced pressure now combine to build up pressure on the hydraulic fluid in the conduit 17 and the motor 18, applying the brake 19.

The pressure in conduit 17 is transmitted through conduit 24 to the liquid in chamber 26 of control valve 13 and pressure is therefore exerted against the piston 28 in accordance with the pressure prevailing in conduit 17. This pressure exerted against piston 28 tends to resist the movement of piston 27 and in resisting said movement tends to return the control valve 13 to lapped position. Obviously the total opposed pressures on the pistons 27 and 28 will depend on the cross sectional areas of the pistons and on the unit pressures prevailing in the chambers 25 and 26. When the unit pressure in chamber 26 is sufficient to move the smaller piston 28 against the larger piston 27, the control member or rod 35 will be moved upward to close the atmosphere port 32. With both the atmosphere port 32 and vacuum port 31 closed as shown in the figure, control valve 13 is in lapped position, and no further booster pressure will be exerted on the brakes until increased manual pressure is exerted on the fluid in cylinder 11. Thus, the brake applying system described is pressure responsive, i. e., the operator is enabled to judge from the "feel" of the pedal the amount of pressure which is being exerted to apply the brakes. When it is desired to release the brakes, pedal 12 may be released to lower the pressure in cylinder 11, with the result that the pressure against piston 28 overcomes the pressure against piston 27 and reopens vacuum port 31 to connect line 21 to vacuum and establish a balance in the booster 20, suspending the booster piston in vacuum. At the same time the hydraulic fluid in the system is returned under the influence of return springs in the brakes, in the cylinders, and at the pedal, to cylinder 11 allowing release of the brake.

While a single illustrative embodiment of my invention has been described it will be readily apparent that many other uses of the invention are possible. It is therefore my intention not to limit my invention except by the terms of the following claim.

I claim:

For use in a hydraulic system having a primary hydraulic pressure and a secondary hydraulic pressure, a control valve structure having two coaxial differential diameter bores, a piston in each of said bores, one subjected to the primary pressure and the other subjected to the secondary pressure, said pistons being independently reciprocable in their bores and being urged by hydraulic pressure toward one another, said control valve structure having an atmosphere port and a vacuum port, poppet valve elements for controlling the opening and closing of said ports, and a floating beam pivoted at one end to one of the poppet valve elements and at the other end to the other of said poppet valve elements, the center of said floating beam being acted on by said opposed reciprocable pistons, one of said poppet valve elements being moved from its seat by movement of the floating beam in one direction and the other of the poppet valve elements being moved from its seat by movement of the floating beam in the opposite direction.

EARL R. PRICE.